Patented June 19, 1934

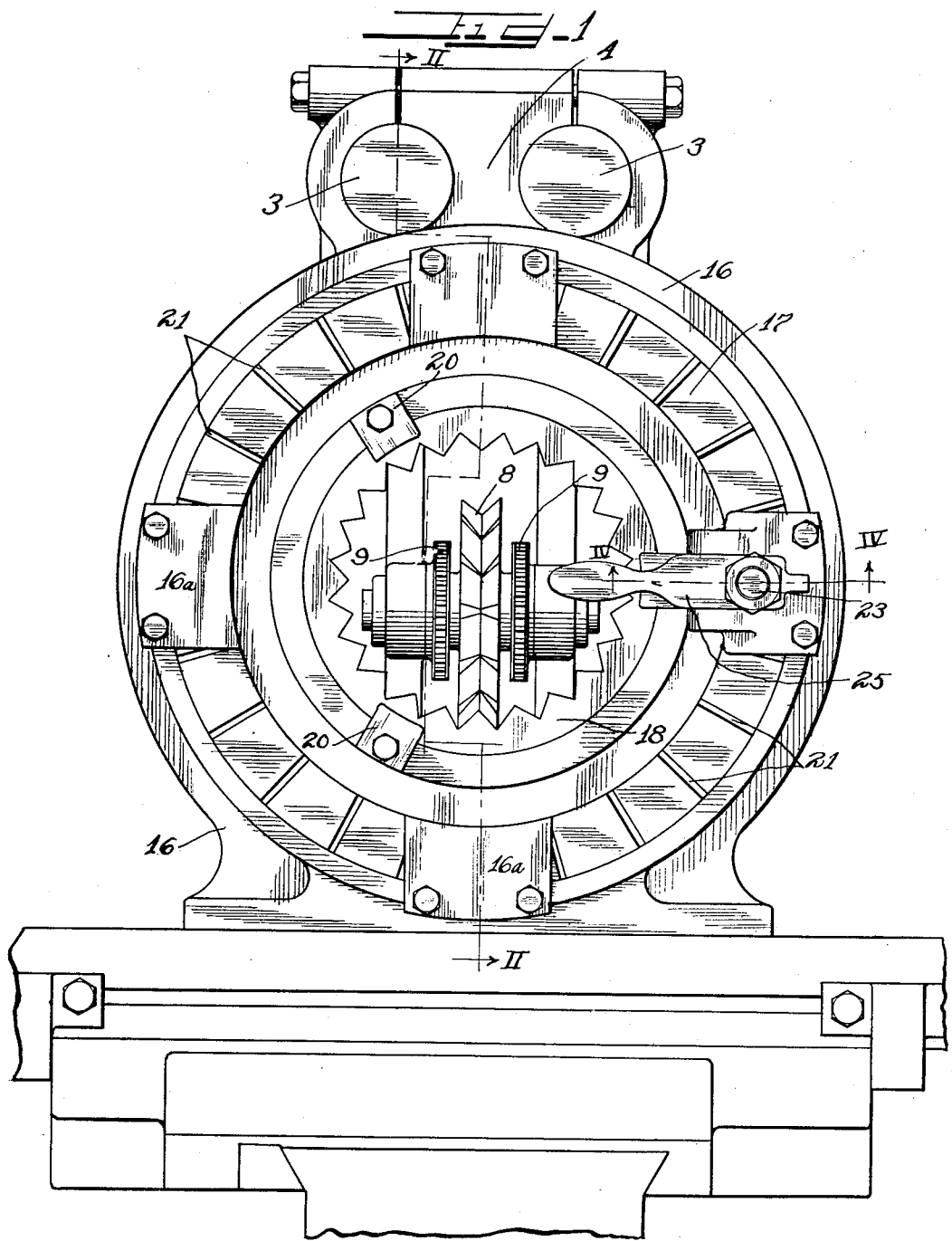

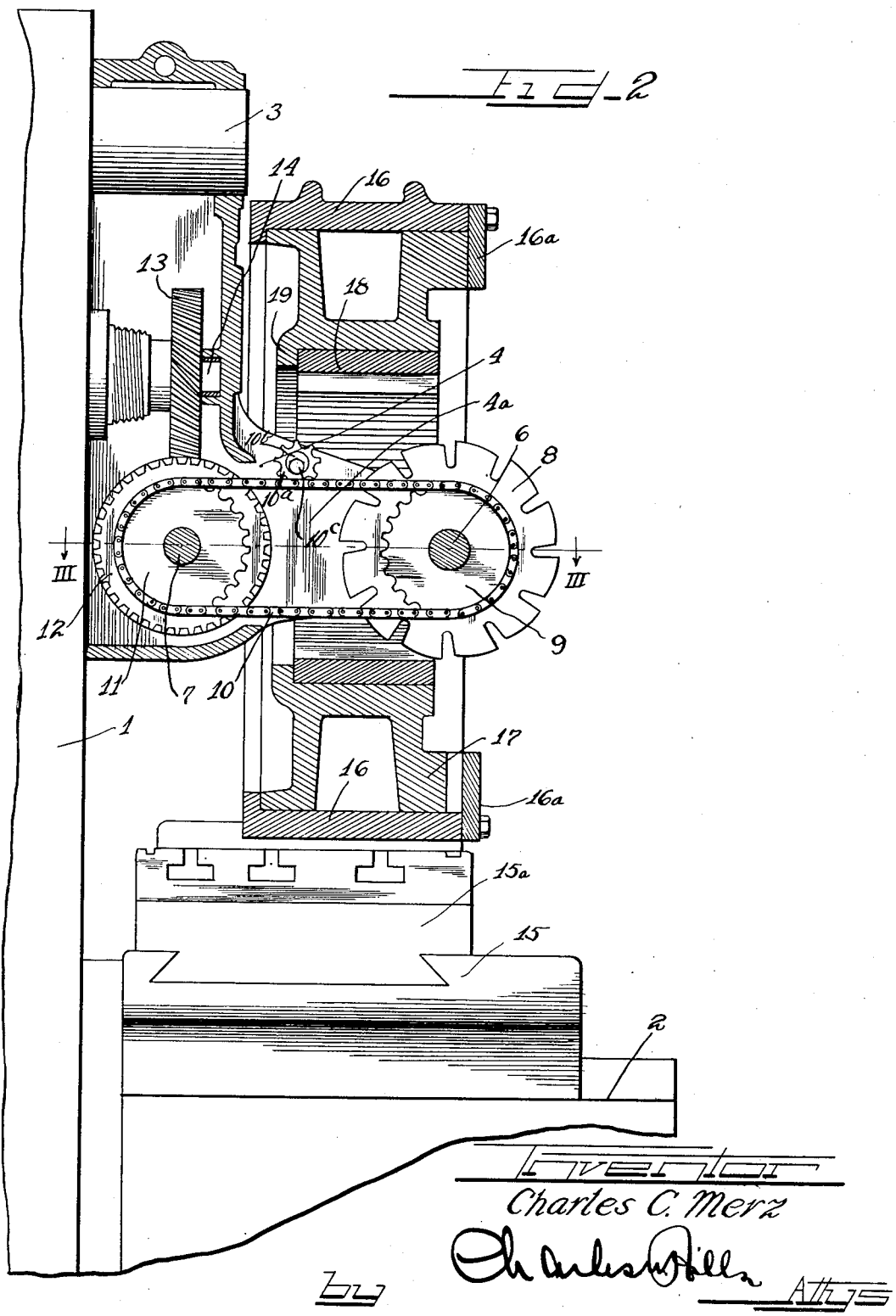

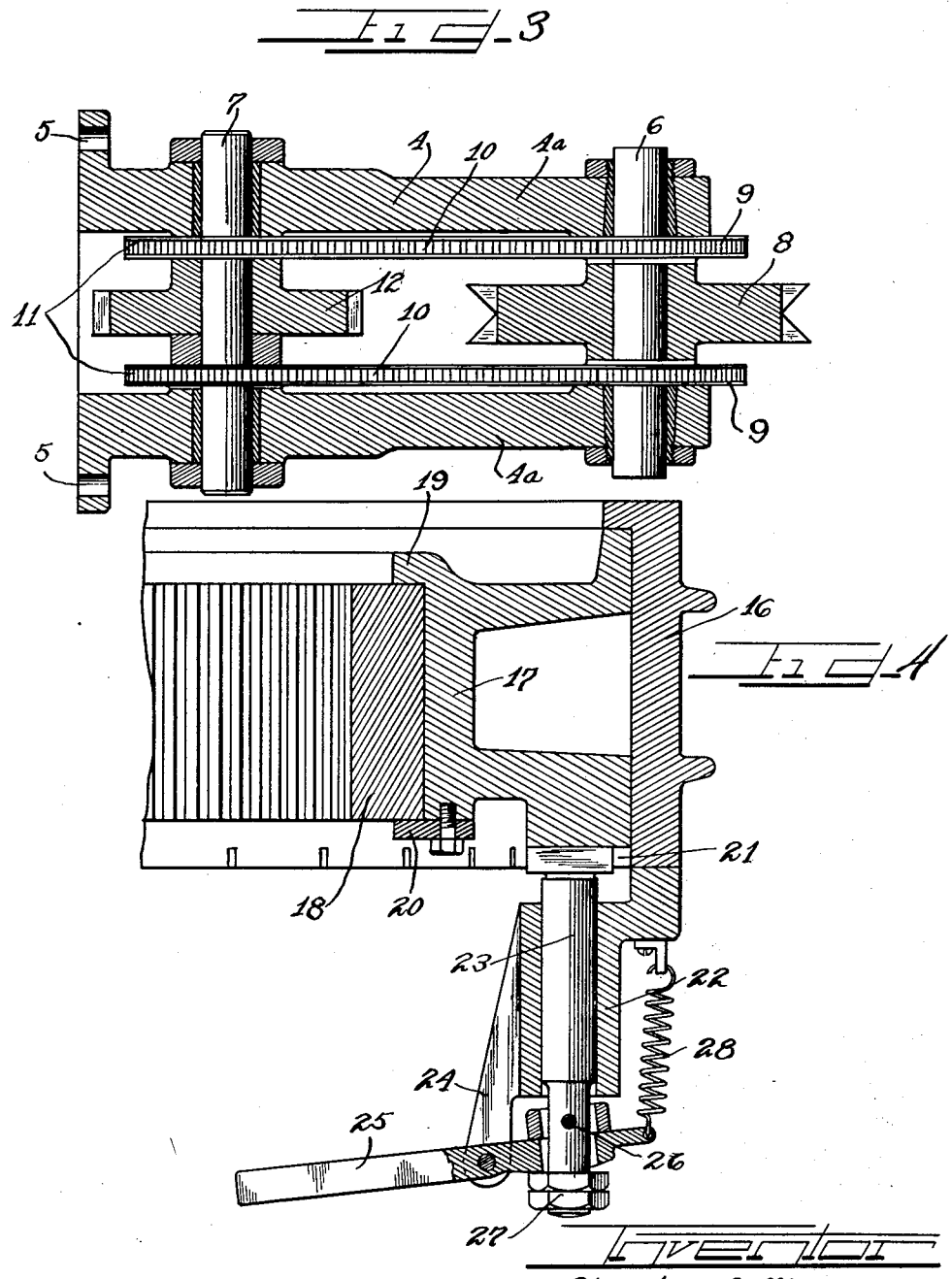

1,963,756

UNITED STATES PATENT OFFICE 1,963,756

GEAR CUTTING APPARATUS

Charles C. Merz, Indianapolis, Ind.

Application December 5, 1930, Serial No. 500,194

3 Claims. (Cl. 90—3)

This invention relates to a gear cutting apparatus and more particularly to a machine for cutting internal teeth on a gear and concerns itself with a rotatable and longitudinally movable gear holder with a rotatable cutter mounted therein.

The invention comprises the novel structure and combination of parts hereinafter described and more particularly pointed out and defined in the appended claims.

In the accompanying drawings which illustrate a preferred form of this invention and in which similar reference numerals refer to similar features in the different views:

Figure 1 is a fragmentary front elevational view of a gear cutting apparatus involving this invention.

Figure 2 is a sectional view taken upon the line II—II of Figure 1.

Figure 3 is an enlarged sectional view taken upon the line III—III of Figure 2 with parts shown in plan view.

Figure 4 is an enlarged sectional view taken upon the line IV—IV of Figure 1.

In the drawings, there is shown a stationary vertical support 1 which may be the frame of a milling machine or the like and having an outwardly extending ledge 2 upon which a part of the apparatus is slidably mounted as will later more fully appear. A pair of studs 3 extend outwardly from the support 1 and a casting generally denoted by the reference character 4 is suspended from these studs and bolted to the support 1 through the bolt holes 5 shown in Figure 3. This casting 4 is bifurcated so as to provide the bearing arms 4a in which the shafts 6 and 7 are journalled in any approved manner.

The shaft 6 rigidly carries a gear cutting element 8 which in the present instance is shown as having a V shaped cutting edge for cutting internal teeth upon a gear. Upon each side of the cutting element there is a sprocket gear 9 rigidly secured to the shaft 6. Sprocket chains 10 are trained over the sprockets 9 and over similar sprockets 11 secured upon the shaft 7 whereby said tool is driven in balanced relation. A small idler sprocket 10a journalled upon an eccentric 10b secured upon a shaft 10c fastened in the bracket 4 cooperates with each chain and is adjustable for taking up wear of the chain through the eccentrics. Between the sprockets 11, there is a worm gear 12 rigidly secured to shaft 7, and which worm gear is adapted to be driven by a worm gear 13 (Figure 2) secured upon a driving shaft 14 journalled in the casting 4 and the support 1. This driving shaft 14 may be driven in any suitable way.

Upon the ledge 2, there is mounted a sliding base or carriage 15 having an upper portion 15a dovetailed thereto. This carriage supports a cylindrical casing or housing 16 in which a cylindrical bearing 17 is rotatably mounted. This bearing serves as the work holder and is designed to contain the gear 18 to be cut. To this end, the bearing 17 is provided with an annular stop shoulder 19 upon its inner portion against which the gear is adapted to abut. The gear is held within the bearing 17 by means of clips or lugs 20 secured to the bearing and overlapping the edge of the gear. The bearing is held within the casing by means of plates 16a bolted to the housing 16 and overlapping the bearing. The lugs 20 are adapted to be removed when it is desired to withdraw the gear.

The bearing 17 is provided with spaced grooves or notches 21 upon its outer edge. These grooves or notches are spaced apart a distance corresponding to the distance between the teeth on the gear and serve as an index for rotating the bearing 17 when the succeeding tooth on the gear is to be cut.

In referring to Figure 4, it will be noted that a bearing socket 22 is attached to the front edge of the casing 16 and a detent 23 is slidably mounted in said socket. The inner end of this detent is fashioned so as to fit in the grooves or notches 21. The bearing socket 22 is provided with a lateral lug 24 upon which a lever 25 is pivoted, and this lever is connected to the detent 23 by means of a pivot pin 26 extending through the lever and also by the nuts 27 upon the end of the detent. To this end the lever 25 is provided with an aperture through which the detent passes, and the end of the lever is connected by a spring 28 to the bearing socket 22. The spring 28 normally tends to urge the lever for maintaining the detent 23 in a groove 21. By swinging the handle portion of the lever toward the machine the detent will be disengaged from the bearing 17 so that the same may be rotated. No special means has been illustrated for rotating the bearing 17 as it is contemplated that it may be manually done.

It will be noted that the rotary cutting tool 8 is located within the bearing 17 in such a position as to cut a tooth in the lower portion of the gear 18. It will of course be understood that the carriage 15 is moved or shifted during the cutting operation with respect to the tool and when one tooth has been cut, the carriage is shifted to bring the gear beyond the tool so that the bearing 17 may be rotated a notch to bring the same in position for cutting the next tooth and these steps will continue until the gear is completed.

From the foregoing, it will be apparent that a very simple and novel machine has been designed for cutting internal gears, in which the gear ring is moved both longitudinally and in a circle with respect to the cutting tool, and in which the amount of rotation is properly gauged.

I am aware that many changes may be made and numerous details of construction may be varied through a wide range without departing from the principles of this invention, and I therefore do not purpose limiting the patent granted hereon otherwise than necessitated by the prior art.

I claim as my invention:

1. In a gear cutting apparatus, a base, a carriage slidably mounted upon said base, said carriage embodying a cylindrical hollow rotatable member, said apparatus having a pair of spaced arms extending into said hollow member, a pair of spaced shafts journalled in said arms, a gear secured upon one shaft, means for driving said gear, a sprocket wheel on each side of said gear, a pair of spaced sprockets upon the other shaft, sprocket chains connecting the sprocket wheels upon said shafts and a cutting tool secured upon said other shaft between said sprocket wheels.

2. In a gear cutting apparatus, a frame having an upright wall, and a horizontal base, a carriage slidably mounted upon said base for movement toward and from said wall, a gear holder rotatably mounted in said carriage, said vertical wall having a pair of outwardly extending parallel arms above said base, a pair of spaced shafts journalled in said arms, a tool secured upon one of said shafts between said arms, a driven gear secured to the other shaft between said arms and parallel gearing connecting said shafts and located between said arms.

3. In a gear cutting apparatus, a frame having an upright wall and a horizontally extending base, a carriage slidably mounted upon said base for movement toward and from said wall, a gear holder rotatably mounted in said carriage, said wall having a pair of outwardly extending parallel arms, a pair of spaced shafts journalled in said arms, a tool secured to one shaft between said arms, a driven gear secured upon the other shaft between said arms and parallel gearing connecting said shaft whereby said tool is driven by balanced and parallel forces.

CHARLES C. MERZ.